(12) United States Patent  
Nagano

(10) Patent No.: US 7,221,700 B2  
(45) Date of Patent: May 22, 2007

(54) CDMA RECEIVER, CDMA RECEIVING METHOD AND PROGRAM THEREOF

(75) Inventor: Yasuhiko Nagano, Tokyo (JP)

(73) Assignee: NEC Corporation, Tokyo (JP)

( * ) Notice: Subject to any disclaimer, the term of this patent is extended or adjusted under 35 U.S.C. 154(b) by 878 days.

(21) Appl. No.: 10/189,077

(22) Filed: Jul. 3, 2002

(65) Prior Publication Data

US 2003/0007548 A1  Jan. 9, 2003

(30) Foreign Application Priority Data

Jul. 6, 2001 (JP) .............................. 2001-206535

(51) Int. Cl.  
*H04B 1/707* (2006.01)

(52) U.S. Cl. ...................................... 375/148

(58) Field of Classification Search ................ 375/142, 375/260, 144–145, 148–150  
See application file for complete search history.

(56) References Cited

U.S. PATENT DOCUMENTS

| | | | |
|---|---|---|---|
| 5,832,025 A * | 11/1998 | Yamamoto | 375/148 |
| 6,532,252 B1 * | 3/2003 | Moon et al. | 375/144 |
| 6,658,046 B1 * | 12/2003 | Miura | 375/148 |
| 6,922,433 B2 * | 7/2005 | Tamura | 375/148 |
| 6,922,434 B2 * | 7/2005 | Wang et al. | 375/148 |
| 2001/0019578 A1 * | 9/2001 | Arima | 375/150 |
| 2002/0061053 A1 * | 5/2002 | Kim et al. | 375/148 |
| 2004/0071193 A1 * | 4/2004 | Atarashi et al. | 375/144 |

FOREIGN PATENT DOCUMENTS

| | | |
|---|---|---|
| EP | 0 932 263 A3 | 7/1999 |
| EP | 0 991 200 A2 | 4/2000 |
| EP | 1 178 614 A2 | 2/2002 |
| GB | 2 346 780 A | 8/2000 |
| JP | 3031352 | 2/2000 |
| JP | 2000-124847 | 4/2000 |
| JP | 2000-174729 | 6/2000 |
| JP | 2001-94472 | 4/2001 |
| WO | WO 02/15427 A2 | 2/2002 |

* cited by examiner

*Primary Examiner*—Young T. Tse  
(74) *Attorney, Agent, or Firm*—Scully, Scott, Murphy & Presser, P.C.

(57) ABSTRACT

A CDMA receiver wherein power consumption can be reduced by conducting receiving operation according to the kind of receiving data is provided. The CDMA receiver obtains a CDMA signal by executing RAKE combination to outputs from a plurality of finger sections in a RAKE combining section. A CPU detects a parameter indicating the kind of transmitting data from the signal after the RAKE combination to control the number of finger sections to be activated according to the detected kind of data. Moreover, a searcher section selects finger sections in the number specified by the CPU so that a timing generating section can supply clock signals to only the selected finger sections. Thereby, it becomes possible to activate finger sections in the number according to the kind of data, thus enabling the power consumption to be reduced.

15 Claims, 2 Drawing Sheets

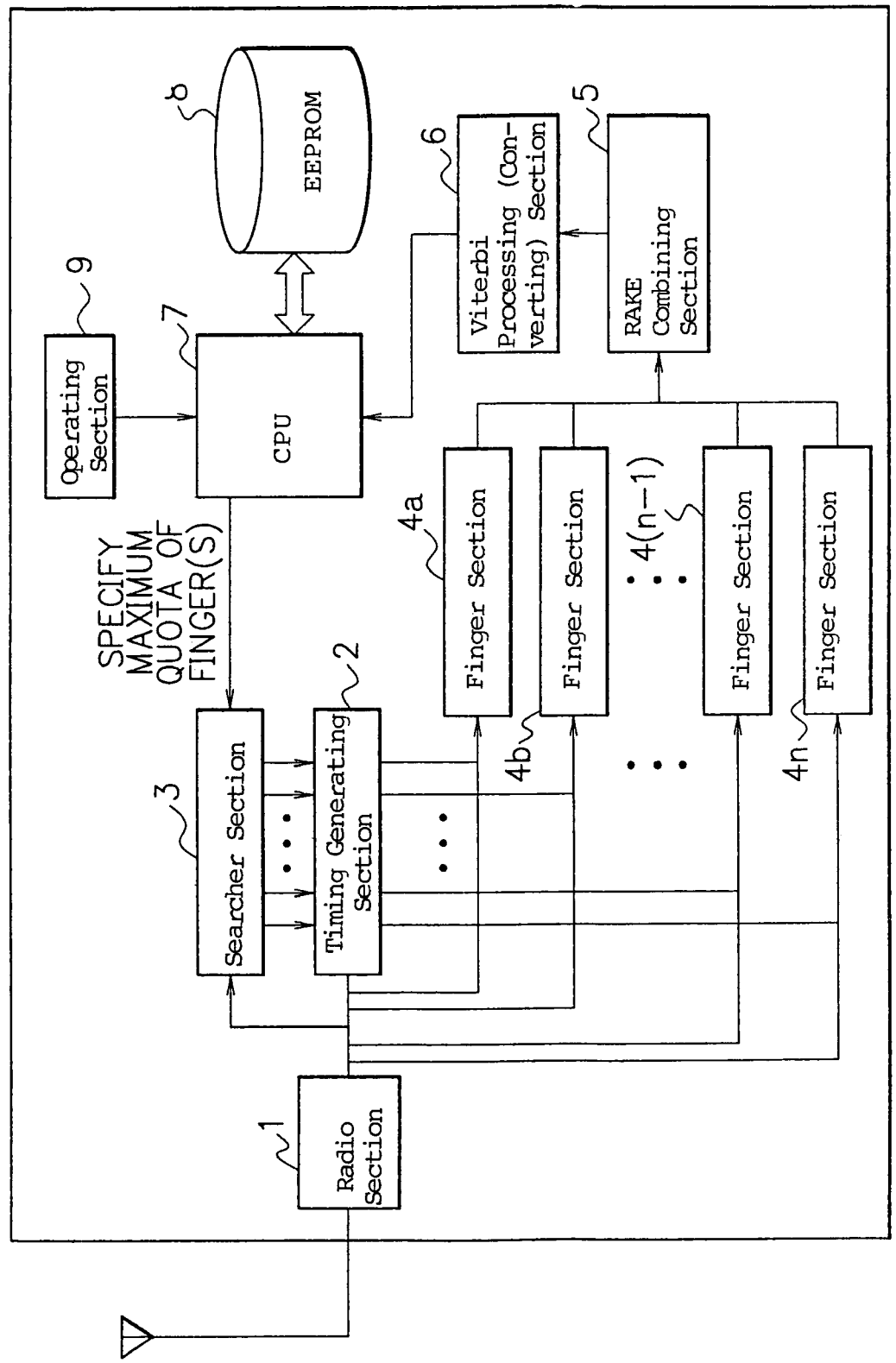
F I G. 1

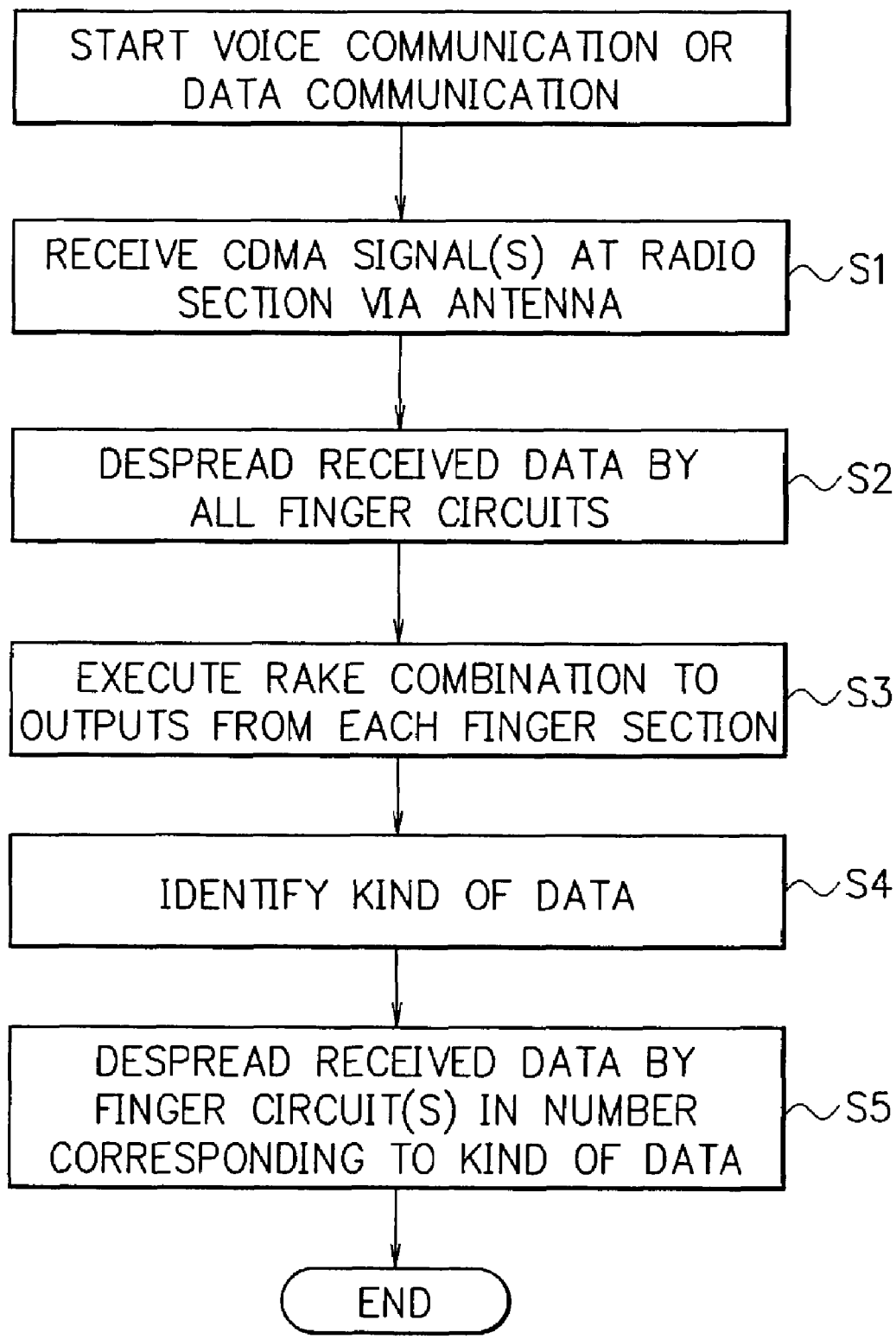

CDMA RECEIVER, CDMA RECEIVING METHOD AND PROGRAM THEREOF

BACKGROUND OF THE INVENTION

The present invention relates to a CDMA receiver for mobile communication using CDMA, a CDMA receiving method and a program thereof, and in particular, to a CDMA receiver having power saving function, a CDMA receiving method and a program thereof

DESCRIPTION OF THE RELATED ART

Recently, a spread spectrum communication method highly insensitive to interference and disturbance has attracted public attention as one of communication methods applicable to a mobile communication system.

In a radio communication system using the spread spectrum communication method, for example, a sending device modulates digitized voice data or image data using a digital modulation method such as the PSK (phase shift keying) or FSK (frequency shift keying), and converts the modulated data to a wideband baseband signal using a spread code such as a pseudonoise code (PN code: pseudorandom noise code), and thereafter, converts the baseband signal to a radio frequency signal to transmit the data.

On the other hand, a receiving device carries out despreading the received radio frequency signal using the same spread code as that used by the sending device, and reproduces the received data by carrying out digital demodulation according to the PSK or FSK.

This kind of system employs the RAKE receiving system as one of countermeasures against a multi-path phenomenon. In the radio communication system, a radio wave for data transmitted from the sending device may reach the receiving device directly or after being reflected by a mountain or building. If the radio wave for the data reaches the receiving device via a plurality of paths, the radio waves for the data passing through the plural paths are synthesized in terms of vector at an antenna end of the receiving device, which leads to deterioration of a reception level. This phenomenon is called multi-path. If the multi-path phenomenon occurs, in a system whose radio channel bandwidth is as narrow as 30 kHz, for example, a receiving device cannot receive any radio signal in some cases. However in the spread spectrum communication system, if the multi-path phenomenon occurs, a receiving device can always receive a radio signal though a part of the radio signal is lost because the radio channel bandwidth is wide.

Thus, in a spread spectrum communication device, multi-path received signals received via a single antenna are divided by the unit of 1 spread code length (1 chip) to be inputted into a plurality of independent demodulators. The demodulators carry out despreading with a spread code corresponding to each path to demodulate the received signals, and the demodulated received signals through the plural paths are synthesized in terms of symbol to reproduce received data. This is called the "RAKE receiving method" because the received signals are collected and synthesized as if by a rake. If the RAKE receiving method is used, time diversity is carried out, thus enabling the reception quality to be improved greatly even when the multi-path occurs.

As an example 1 similar in the technical field to the present invention, "a CDMA mobile communication receiver" is disclosed in Japanese Patent Application Laid-Open No. 2000-124847. This prior example 1 is intended to provide a mobile communication receiver using a CDMA method to reduce power consumption by selecting and activating a finger circuit(s) corresponding to only a line(s) having good condition and a RAKE combining circuit. To accomplish the purpose, the CDMA mobile communication receiver in a radio communication system including a plurality of base stations and mobile stations comprises a searcher means, a demodulation means, a combining means and a control means. The searcher means detects multi-path characteristics such as a time delay, etc. on a line(s) from a pilot signal transmitted from a base station. The demodulation means includes a plurality of correlators for demodulating received signals. The combining means combines outputs from the respective correlators in the demodulation means. The control means controls selection of outputs from the correlators to be combined in the combining means on the basis of the multi-path characteristics detected by the searcher means.

As an example 2 similar in the technical field to the present invention, a CDMA receiving device is disclosed in Japanese Patent Laid Open No. 2000-174729. The prior example 2 is intended to provide a CDMA receiving device capable of guaranteeing maximum reception quality even in a weak electric field and reducing power consumption by stopping operation of unnecessary fingers. To accomplish the purpose, the CDMA receiving device includes a plurality of fingers and carries out RAKE reception by executing RAKE combination to outputs from the plural fingers. Further, the CDMA receiving device comprises a multi-path detecting means and a delay profile creating means. The multi-path detecting means detects a plurality of multi-paths each having delay time with different timing by despreading received signals. The delay profile creating means finds out received power levels in the respective multi-paths detected by the multi-path detecting means to create a delay profile. In the CDMA receiving device, a difference is found out between the "i"th largest signal level and the "i+1"th largest signal level in the data of the delay profile, and operation of a finger(s) corresponding to a signal having a weaker level is stopped on the basis of a result of comparison between the difference and a predetermined threshold value.

As an example 3 similar in the technical field to the present invention, a receiving circuit and a mobile terminal having the same is disclosed in Japanese Patent No. 3031352. The receiving circuit comprises at least an antenna and radio section, a plurality of finger receivers, and a combining section. The antenna and radio section receives a signal(s) transmitted through radio. The plurality of finger receivers despreads the signals received via the antenna and radio section correspondingly to each of multi-paths, respectively. The combining section combines the signals despread at the plural finger receivers. In the receiving circuit, it is detected whether or not the signal(s) received via the antenna and radio section includes voice or data. When the signal includes voice or data, all finger receivers are activated. On the other hand, when the signal does not include voice or data, the number of finger receivers to be activated is controlled according to the number of base station devices that are now communicating with the receiving circuit.

Recently, a mobile communication receiver, in particular, a mobile terminal having a function to access a network such as the Internet has become widely used. Accordingly, the style of data exchanged between a base station and a mobile terminal has variations, for example, audio data such as music, moving image data, text data in characters, etc.

Under such circumstances, if changing the quota of fingers only to reduce power consumption in disregard of the kind of data received by the mobile communication receiver as described in the prior examples 1 and 2, adverse result may be obtained according to receiving data. For example, when executing voice communication, a user does not clearly perceive a reception error even if the reception error occurs in approximately several 10 milliseconds (ms). On the other hand, in the case of using television phone, etc., if such an error occurs, this has a large effect on the screen.

In the aforementioned prior example 3, the receiving circuit relates to a technique for detecting silence sections generated during communication to change the quota of fingers. Therefore, the receiving circuit does not control the quota of fingers in consideration of the kind of received data.

SUMMARY OF THE INVENTION

It is therefore an object of the present invention to provide a CDMA receiver capable of reducing power consumption by executing receiving operation according to the kind of receiving data, a CDMA receiving method and a program thereof.

According to a first aspect of the present invention, for achieving the objects mentioned above, there is provided a CDMA receiver for conducting RAKE reception by executing RAKE combination (synthesis) of outputs from a plurality of fingers, comprising:

a controlling means for detecting a parameter indicating a type of transmitting data from a signal after the RAKE combination, and controlling the number of fingers to be activated according to the detected kind of the data; and an operation controlling means for selecting fingers in a number specified by the controlling means, and activating the selected fingers to receive signals.

According to a second aspect of the present invention, in the first aspect, the operation controlling means includes a multi-path detecting means for detecting a plurality of multi-paths with different timings by despreading received signals, and a delay profile creating means for finding out a receiving power level in each of the multi-paths detected by the multi-path detecting means to create a delay profile, and detects, from the delay profile, receiving timings of the same number specified by the controlling means from the strongest receiving power level to activate fingers that conduct receiving operation with the detected receiving timings.

According to a third aspect of the present invention, in the first or second aspect, the operation controlling means supplies clock signals to the selected fingers to control receiving operation of the fingers.

According to a fourth aspect of the present invention, there is provided a CDMA receiving method for a CDMA receiver for conducting RAKE reception by executing RAKE combination to outputs from a plurality of fingers, comprising:

a finger number determining step of detecting a parameter indicating a kind of transmitting data from a signal after the RAKE combination, and determining the number of fingers to be activated according to the detected kind of the data; and a finger controlling step of selecting fingers of the same number determined in the finger number determining step, and activating the selected fingers to receive signals.

According to a fifth aspect of the present invention, in the fourth aspect, the CDMA receiving method for a CDMA receiver further includes:

a multi-path detecting step of detecting a plurality of multi-paths with different timings by despreading received signals; and a delay profile creating step of finding out a receiving power level in each of the multi-paths detected in the multi-path detecting step to create a delay profile; wherein the finger controlling step further includes a step of detecting, from the delay profile, receiving timings of the same number specified (determined) in the finger number determining step from the strongest receiving power level to activate fingers that conduct receiving operation with the detected receiving timings.

According to a sixth aspect of the present invention, in the fourth or fifth aspect, the finger control step further includes a step of supplying clock signals to the selected fingers to control receiving operation of the fingers.

According to a seventh aspect of the present invention, there is provided a CDMA receiving program for a CDMA receiver for conducting RAKE reception by executing RAKE combination to outputs from a plurality of fingers, executing:

a finger number determining process of detecting a parameter indicating a kind of transmitting data from a signal after the RAKE combination, and determining the number of fingers to be activated according to the detected kind of the data; and a finger controlling process of selecting fingers of the same number determined in the finger number determining process, and activating the selected fingers to receive signals.

According to an eighth aspect of the present invention, in a seventh aspect, the CDMA receiving program for a CDMA receiver further executes:

a multi-path detecting process of detecting a plurality of multi-paths with different timings by despreading received signals; and a delay profile creating process of finding out a receiving power level in each of the multi-paths detected in the multi-path detecting process to create a delay profile; wherein the finger controlling process further includes a process of detecting, from the delay profile, receiving timings of the same number specified in the finger number determining process from the strongest receiving power level to activate fingers that conduct receiving operation with the detected receiving timings.

According to a ninth aspect of the present invention, in the seventh or eighth aspect, the finger controlling process further includes a process of supplying clock signals to the selected fingers to control receiving operation of the fingers.

BRIEF DESCRIPTION OF THE DRAWINGS

The objects and features of the present invention will become more apparent from the consideration of the following detailed description taken in conjunction with the accompanying drawings in which:

FIG. 1 is a block diagram showing a configuration of an embodiment of the present invention; and FIG. 2 is a flowchart showing operation procedure according to the embodiment of the present invention.

DESCRIPTION OF THE PREFERRED EMBODIMENT

Referring now to the drawings, an embodiment of the present invention is explained in detail. FIGS. 1 and 2 respectively show an embodiment of a CDMA (code division multiple access) receiver, a CDMA receiving method and a program thereof according to the present invention.

FIG. 1 shows a configuration of a CDMA receiver according to an embodiment of the present invention. The CDMA receiver comprises a radio section 1, a timing generating section 2, a searcher section 3, a plurality of finger sections 4a through 4n, a RAKE combining section 5, a Viterbi processing (converting) section 6, a central processing unit (CPU) 7, an electrically erasable and programmable read only memory (EEPROM) 8, and an operating section 9. Incidentally, FIG. 1 shows only a hardware configuration related to a receiving system, and a configuration for a sending system and the explanation thereof are abbreviated.

The radio section 1 converts analog data to digital data when receiving data, and converts digital data to analog data when transmitting data.

The timing generating section 2 supplies base clock signals to whole hardware in the receiver. The timing generating section 2 supplies the clock signals to each section in consideration of an offset(s) from the searcher section 3.

The searcher section 3 monitors the amount of delay of receiving timing owing to move of the CDMA receiver and multi-paths owing to reflections by a building, etc. That is, the searcher section 3 finds out signal strength of the respective multi-paths using an output(s) from the radio section 1 to create a delay profile. Subsequently, the searcher section 3 extracts, from data in the delay profile, data of paths each having one of the strongest predetermined number of signals to inform the timing generating section 2 about the result. When executing handover, the searcher section 3 monitors multi-paths in at most three perch channels and reports the offsets for receiving timing at the respective finger sections to the timing generating section 2. Moreover, the searcher section 3 controls the timing generating section 2 so as to activate only the specified number of finger sections 4a through 4n according to an instruction from the CPU 7.

The finger sections 4a through 4n are demodulators for executing receiving processes in synchronization with the clocks from the timing generating section 2, respectively. The respective finger sections 4a through 4n conduct despreading processes with a predetermined spread code with respect to each area to retrieve pre-spread signals. Incidentally, spreading means an operation of scrambling data to be transmitted with a code in the transmitting end. To the contrary, in the receiving end, despreading is conducted with the same code as that used in the transmitting end to retrieve pre-scrambled data. When the multi-path phenomenon occurs, a wave for data from a base station may reach a receiving end through a plurality of paths with different receiving timings. In this case, some of the finger sections 4a through 4n may receive signals having the same code with different timings.

The RAKE combining section 5 executes processes of combining data received by each finger section, namely, combining processes of multi-path components. When data is transmitted from a base station, the receiver receives a plurality of radio waves for the data because of the multi-path phenomenon. Thereby, by combining the plurality of waves, higher reception quality can be obtained. Moreover, while the receiver receives waves from at most three areas at handover, each content of the receiving data in the waves is identical to each other though the area is different from each other.

The Viterbi processing section 6 compounds data per unit of frame (10 msec) combined by the RAKE combining section 5 to inform the CPU 7 as receiving data per unit of several frames.

The CPU 7 controls each section described above and controls transmission of the data per unit to a voice codec section (not shown). Moreover, the CPU 7 detects a parameter indicating the kind of transmitting data from the signal after the RAKE combination to control the number of finger sections to be activated according to the kind of data.

The EEPROM 8 is a ROM for storing parameter values necessary for operation of hardware and software. The data in the EEPROM 8 is kept stored if the power of the receiver is turned off.

The operating section 9 is disposed so that a user can input a destination telephone number, etc. when beginning communication. Moreover, an operation mode, etc. set by the user is inputted through the operating section 9 to be registered in the EEPROM 8 under the control of the CPU 7.

The CDMA receiver according to the embodiment of the present invention having the configuration described above has functions not only to normally communicate by voice data such as a telephone function but also to access a network such as the Internet to acquire contents registered in a content server. Incidentally, the contents may be text data only with characters, audio (including sound, voice, music, etc.) data such as melody signaling an incoming call, moving images, static images, and the like. Moreover, the CDMA receiver may receive a static image and moving image taken with a camera mounted in a mobile terminal in a sending end.

When receiving such data, for example, in the case of executing voice communication, a user does not clearly perceive a reception error even if the reception error occurs in approximately several 10 ms. On the other hand, in the case of receiving a moving image using a television phone, etc., if such an error occurs, this has a large effect on the screen, which may make a user uncomfortable.

The CDMA receiver for mobile communication using the CDMA method comprises the plural finger sections and the RAKE combining section (circuit) for combining signals demodulated by the finger sections. However, if the demodulating processes are executed by all of the finger sections disposed therein, the power consumption may be greatly increased, and thereby, the battery survival time becomes short.

The embodiment of the present invention, which has been devised to solve the problems, is intended to reduce the power consumption of the receiver by changing the quota of the finger sections according to the kind of receiving data.

In the following, an explanation will be given of operation procedure of the present invention to achieve the purpose referring to a flowchart in FIG. 2.

When the radio section 1 receives data (a CDMA signal (s)) via the antenna (Step S1), the finger sections 4a through 4n despread the received signals (Step S2). Subsequently, the RAKE combining section 5 combines the despread signals (Step S3). The combined signal thus obtained is transferred to the CPU 7 via the Viterbi processing section 6. The data part of the CDMA signal(s) transmitted from the sending device includes a parameter indicating the kind of transmitting data. The CPU 7 detects the parameter included in the data part and identifies the kind of data transmitted from the sending device (Step S4). The CPU 7 directs the searcher section 3 to energize the finger sections in the number corresponding to the kind of data to demodulate the CDMA signals.

The searcher section 3 detects, from the created delay profile, receiving timings of paths each having one of the strongest predetermined number of signals, the number having been directed by the CPU 7. Subsequently, the searcher section 3 directs the timing generating section 2 to activate only the finger sections that receive each signal at the detected receiving timings.

The timing generating section 2 supplies clock signals only to the finger sections specified by the searcher section 3. Thereby, only a number of finger sections specified by the CPU 7 are activated (Step S5).

By this means, according to this embodiment, it becomes possible to activate a number of finger sections necessary for respective types of received data. Therefore, it becomes possible to regulate operation of finger sections unnecessary for data reception, thus enabling the power consumption to be reduced.

Moreover, by detecting, from the delay profile, the receiving timings in the number corresponding to the kind of the receiving data from the strongest receiving power level to activate only the finger sections that conduct receiving operation with the detected timings, it becomes possible to activate the finger sections in the best number for the kind of receiving data, thus enabling the reception quality to be improved.

Incidentally, an embodiment of a CDMA receiving program for the CDMA receiver can be implemented by installing a program for executing control in line with the above-described operation procedure in each section shown in FIG. 1 so that each section can operate according to the program.

As set forth hereinbefore, the CDMA receiver according to the present invention detects the parameter indicating the kind of transmitting data from the signal to which the RAKE combination was executed, determines the number of finger sections to be activated according to the detected kind of data, and selects the finger sections in the determined number so that only the selected finger sections can receive signals. Thereby, it becomes possible to activate the finger sections in the best number for the kind of receiving data. Accordingly, it becomes possible to regulate the operation of finger sections unnecessary for data reception, thus enabling the power consumption to be reduced.

Moreover, by detecting, from the delay profile, the receiving timings in the number corresponding to the kind of the receiving data from the strongest receiving power level to activate only the finger sections that conduct receiving operation with the detected timings, it becomes possible to activate the finger sections in the best number for the kind of receiving data, thus enabling the reception quality to be improved.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A CDMA receiver for conducting RAKE reception by executing RAKE combination to outputs from a plurality of fingers, comprising:
   a controlling means for detecting a parameter indicating a kind of transmitting data from a signal after the RAKE combination, and controlling the number of the plurality of fingers to be activated according to the detected kind of the transmitting data; and
   an operation controlling means for selecting fingers of the same number specified by the controlling means, and activating the selected fingers to receive signals.

2. The CDMA receiver as claimed in claim 1, wherein: the operation controlling means includes:
   a multi-path detecting means for detecting a plurality of multi-paths with different timings by despreading received signals; and
   a delay profile creating means for finding out a receiving power level in each of the multi-paths detected by the multi-path detecting means to create a delay profile; wherein
   the operation controlling means detects, from the delay profile, receiving timings of the same number specified by the controlling means from the strongest receiving power level to activate fingers that conduct receiving operation with the detected receiving timings.

3. The CDMA receiver as claimed in claim 1, wherein the operation controlling means supplies clock signals to the selected fingers to control receiving operation of the fingers.

4. The CDMA receiver as claimed in claim 1, wherein: the operation controlling means includes:
   a multi-path detecting means for detecting a plurality of multi-paths with different timings by despreading received signals; and
   a delay profile creating means for finding out a receiving power level in each of the multi-paths detected by the multi-path detecting means to create a delay profile; and wherein
   the operation controlling means detects, from the delay profile, receiving timings of the same number specified by the controlling means from the strongest receiving power level to activate fingers that conduct receiving operation with the detected receiving timings; and
   the operation controlling means supplies clock signals to the selected fingers to control receiving operation of the fingers.

5. The CDMA receiver as claimed in claim 1, wherein the kind of transmitting data is text, sound, and image data.

6. A CDMA receiving method for a CDMA receiver for conducting RAKE reception by executing RAKE combination to outputs from a plurality of fingers, comprising:
   a finger number determining step of detecting a parameter indicating a kind of transmitting data from a signal after the RAKE combination, and determining the number of the plurality of fingers to be activated according to the detected kind of the transmitting data; and
   a finger controlling step of selecting fingers of the same number determined in the finger number determining step, and activating the selected fingers to receive signals.

7. The CDMA receiving method for the CDMA receiver as claimed in claim 6, wherein the finger controlling step further includes;
   a multi-path detecting step of detecting a plurality of multi-paths with different timings by despreading received signals;
   a delay profile creating step of finding out a receiving power level in each of the multi-paths detected in the multi-path detecting step to create a delay profile; and
   a detecting step of detecting, from the delay profile, receiving timings of the same number specified in the finger number determining step from the strongest receiving power level to activate fingers that conduct receiving operation with the detected receiving timings.

8. The CDMA receiving method for the CDMA receiver as claimed in claim 6, wherein the finger controlling step further includes a step of supplying clock signals to the selected fingers to control receiving operation of the fingers.

9. The CDMA receiving method for the CDMA receiver as claimed in claim 6, wherein the finger controlling step further includes a multi-path detecting step of detecting a plurality of multi-paths with different timings by despreading received signals;

a delay profile creating step of finding out a receiving power level in each of the multi-paths detected in the multi-path detecting step to create a delay profile;

a detecting step of detecting, from the delay profile, receiving timings of the same number specified in the finger number determining step from the strongest receiving power level to activate fingers that conduct receiving operation with the detected receiving timings; and a step of supplying clock signals to the selected fingers to control receiving operation of the fingers.

10. The CDMA receiving method for the CDMA receiver as claimed in claim 6, wherein the kind of transmitting data is text, sound, and image data.

11. A CDMA receiving program for a CDMA receiver for conducting RAKE reception by executing RAKE combination to outputs from a plurality of fingers, executing:

a finger number determining process of detecting a parameter indicating a kind of transmitting data from a signal after the RAKE combination, and determining the number of the plurality of fingers to be activated according to the detected kind of the transmitting data; and a finger controlling process of selecting fingers of the same number determined in the finger number determining process, and activating the selected fingers to receive signals.

12. The CDMA receiving program for the CDMA receiver as claimed in claim 11, wherein the finger controlling process includes a multi-path detecting process of detecting a plurality of multi-paths with different timings by despreading received signals;

a delay profile creating process of finding out a receiving power level in each of the multi-paths detected in the multi-path detecting process to create a delay profile; and a detecting process of detecting, from the delay profile, receiving timings of the same number specified in the finger number determining process from the strongest receiving power level to activate fingers that conduct receiving operation with the detected receiving timings.

13. The CDMA receiving program for the CDMA receiver as claimed in claim 11, wherein the finger controlling process further includes a process of supplying clock signals to the selected fingers to control receiving operation of the fingers.

14. The CDMA receiving program for the CDMA receiver as claimed in claim 11, wherein the finger controlling process includes:

a multi-path detecting process of detecting a plurality of multi-paths with different timings by despreading received signals;

a delay profile creating process of finding out a receiving power level in each of the multi-paths detected in the multi-path detecting process to create a delay profile;

a detecting process of detecting, from the delay profile, receiving timings of the same number specified in the finger number determining process from the strongest receiving power level to activate fingers that conduct receiving operation with the detected receiving timings; and a process of supplying clock signals to the selected fingers to control receiving operation of the fingers.

15. The CDMA receiving program for the CDMA receiver as claimed in claim 11, wherein the kind of transmitting data is text, sound, and image data.

* * * * *